US012473757B2

(12) United States Patent
Foerst et al.

(10) Patent No.: US 12,473,757 B2
(45) Date of Patent: Nov. 18, 2025

(54) MOTOR VEHICLE LOCK

(71) Applicant: Brose Fahrzeugteile GmbH SE & Co. Kommanditgesellschaft, Bamberg, Bamberg (DE)

(72) Inventors: Daniel Foerst, Bamberg (DE); Thomas Salhoff, Hallstadt (DE); Norbert Hess, Coburg (DE); Jakub Stasko, Ostrava (CZ)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 21 days.

(21) Appl. No.: 18/287,719

(22) PCT Filed: Apr. 22, 2022

(86) PCT No.: PCT/EP2022/060730
§ 371 (c)(1),
(2) Date: Oct. 20, 2023

(87) PCT Pub. No.: WO2022/223799
PCT Pub. Date: Oct. 27, 2022

(65) Prior Publication Data
US 2024/0183203 A1 Jun. 6, 2024

(30) Foreign Application Priority Data
Apr. 23, 2021 (DE) ..................... 10 2021 110 406.8

(51) Int. Cl.
*E05B 81/58* (2014.01)
*E05B 81/16* (2014.01)
(Continued)

(52) U.S. Cl.
CPC .............. *E05B 81/58* (2013.01); *E05B 81/16* (2013.01); *E05B 81/18* (2013.01); *E05B 81/20* (2013.01); *E05B 81/21* (2013.01)

(58) Field of Classification Search
CPC .......... E05B 81/18; E05B 81/20; E05B 81/21; E05B 81/58
See application file for complete search history.

(56) References Cited

U.S. PATENT DOCUMENTS 10,100,559 B2 * 10/2018 Machida ................. E05B 81/20
10,871,011 B2 * 12/2020 Rosales ................... E05B 81/20
(Continued)

FOREIGN PATENT DOCUMENTS

DE 2906860 A * 9/1980 ............. E05B 81/20
DE 19939651 10/2002
(Continued)

OTHER PUBLICATIONS

Computer Generated Translation for WO 2009068017 A2, Generated on Jan. 8, 2025, https://worldwide.espacenet.com/ (Year: 2025).*
(Continued)

*Primary Examiner* — Alyson M Merlino
(74) *Attorney, Agent, or Firm* — Pauly, DeVries Smith & Deffner LLC

(57) ABSTRACT

A motor vehicle lock for a flap of a motor vehicle. The motor vehicle lock is equipped with a lock catch for engaging with a closing part in a holding manner and a pawl which is paired with the lock catch and which locks an opening of the lock catch in the lowered position and releases the lock catch in a raised position, wherein the motor vehicle lock has an electric closing drive and a control assembly, wherein the control assembly actuates the closing drive in a closing routine so as to move the lock catch in the closing direction from a starting position. The control assembly actuates the
(Continued)

closing drive in the closing routine so as to move the lock catch from the starting position into a delay position in order to carry out a delay action and then move the lock catch into the main closing position.

10 Claims, 2 Drawing Sheets

(51) Int. Cl.
*E05B 81/18* (2014.01)
*E05B 81/20* (2014.01)

(56) References Cited

U.S. PATENT DOCUMENTS

| | | | | |
|---|---|---|---|---|
| 11,027,646 | B2 * | 6/2021 | Kothe | E05B 81/20 |
| 11,359,418 | B2 * | 6/2022 | Rosales | E05B 81/20 |
| 11,536,059 | B2 * | 12/2022 | Rosales | E05B 81/20 |
| 11,619,078 | B2 * | 4/2023 | Rosales | E05B 81/20 292/201 |
| 2009/0151257 | A1 * | 6/2009 | Dominique | E05B 81/20 292/2 |
| 2016/0251888 | A1 * | 9/2016 | Makino | E05B 81/20 49/280 |
| 2019/0376323 | A1 | 12/2019 | Rosales | |
| 2020/0024875 | A1 | 1/2020 | Rosales | |
| 2022/0243503 | A1 * | 8/2022 | Osmialowski | E05B 81/21 |

FOREIGN PATENT DOCUMENTS

| | | | | |
|---|---|---|---|---|
| DE | 10243893 | A1 * | 4/2004 | E05B 81/20 |
| DE | 102004060280 | | 6/2006 | |
| DE | 202007016719 | | 4/2009 | |
| DE | 102008062641 | | 6/2010 | |
| DE | 102012107800 | | 2/2014 | |
| DE | 102019107692 | A1 * | 10/2020 | |
| FR | 2861654 | A1 * | 5/2005 | B60J 10/00 |
| JP | 2003336442 | A * | 11/2003 | E05B 81/20 |
| JP | 2009197483 | | 9/2009 | |
| JP | 2018115518 | | 7/2018 | |
| JP | 2020051071 | | 4/2020 | |
| WO | WO-2009068017 | A2 * | 6/2009 | E05B 81/20 |
| WO | 2022223799 | | 10/2022 | |

OTHER PUBLICATIONS

"German Search Report," for German Patent Application No. 102021110406.8 mailed Mar. 9, 2022 (7 pages).
"International Search Report and Written Opinion," for PCT Application No. PCT/EP2022/060730 mailed Jul. 11, 2022 (13 pages).

* cited by examiner

MOTOR VEHICLE LOCK

CROSS-REFERENCE TO RELATED APPLICATIONS

This application is a national stage application under 35 U.S.C. 371 of International Patent Application Serial No. PCT/EP2022/060730, entitled "Motor Vehicle Lock," filed Apr. 22, 2022, which claims priority from German Patent Application No. DE 10 2021 110 406.8, filed Apr. 23, 2021, the disclosure of which is incorporated herein by reference.

FIELD OF THE TECHNOLOGY

Various embodiments relate to a motor vehicle lock and a method for operating a motor vehicle lock.

BACKGROUND

US 2020/0024875 A1 discloses a motor vehicle lock.

The motor vehicle lock under discussion can be assigned to any flap of a motor vehicle. These flaps include tailgates, trunk lids, front hoods, in particular engine hoods, side doors, rear doors or the like. These flaps can be designed to be pivotable or in the manner of sliding doors.

In order to increase the user-friendliness when closing the flap, nowadays motor vehicle locks are frequently provided with a closing aid. The closing aid ensures a motorized movement of the lock catch of the motor vehicle lock from a starting position, such as from a pre-closing position, into a main closing position which involves, for example, pulling the respective flap from a pre-latching position into a main latching position. Specifically this last part of the closing motion of the flap requires a significant application of force counter to the door seal pressure so that an improvement in the ease of use is achieved via the motorized movement of the lock catch.

While the closing aid increases the user-friendliness in a very intuitive manner, the motorized movement of the lock catch also involves a certain risk of injury. The reason for this is that in the starting position generally a certain gap remains between the flap and the vehicle body. When the closing aid is activated, a considerable force acts on an object, in particular a finger located in the gap, which can lead to significant injuries.

The known motor vehicle lock (US 2020/0024875 A1) provides a mechanical overload clutch for the closing drive, a transmission of excessive forces in a first portion of the movement of the lock catch being avoided thereby.

SUMMARY

However, there is a challenge of improving safety during the operation of the motor vehicle lock without having to implement additional mechanical measures.

The problem underlying various embodiments is to design and develop the known motor vehicle lock such that a further optimization is achieved relative to the aforementioned challenge.

The above problem is solved by various embodiments described herein.

Essentially, the principal consideration is that by activating the closing drive in the closing routine a delay action is carried out which enables the user to react in good time to the flap motion which has been initiated. The delay action is carried out after a movement of the lock catch into a delay position so that, by this motion which has been initiated, a signal is intuitively provided to the user relative to the start of the closing routine.

In detail, it is proposed that the control assembly activates the closing drive in the closing routine so as to move the lock catch from the starting position into a delay position in order to carry out a delay action and then to move the lock catch into the main closing position.

The above problem is also solved by a method as described herein.

Various embodiments provide a motor vehicle lock for a flap of a motor vehicle, wherein the motor vehicle lock is equipped with a lock catch for engaging with a closing part in a holding manner and a pawl which is assigned to the lock catch and which locks an opening of the lock catch in the lowered position and releases the lock catch in a raised position, wherein the motor vehicle lock has an electric closing drive and a control assembly, wherein the control assembly activates the closing drive in a closing routine so as to move the lock catch in the closing direction from a starting position, such as a pre-closing position, into a main closing position, wherein the control assembly activates the closing drive in the closing routine so as to move the lock catch from the starting position into a delay position in order to carry out a delay action and then move the lock catch into the main closing position.

In various embodiments, in the delay action an activation by the control assembly is absent for a predetermined time period and/or that in the delay action the control assembly activates the closing drive so as to move the lock catch counter to the closing direction.

In various embodiments, the control assembly activates the closing drive in the closing routine so as to move the lock catch successively into a plurality of delay positions in order to carry out the respective delay actions.

In various embodiments, the control assembly in the closing routine, such as with the movement of the lock catch into the delay position and/or with the delay action, initiates the output of a warning signal, such as via an optical and/or acoustic warning device assigned to the motor vehicle lock.

Various embodiments provide a method for operating a motor vehicle lock for a flap of a motor vehicle, wherein the motor vehicle lock is equipped with a lock catch for engaging with a closing part in a holding manner and a pawl which is assigned to the lock catch and which locks an opening of the lock catch in the lowered position and releases the lock catch in a raised position, wherein the motor vehicle lock has an electric closing drive and a control assembly, wherein the closing drive is activated by means of the control assembly in a closing routine so as to move the lock catch in the closing direction from a starting position, such as a pre-closing position, into a main closing position, wherein the closing drive is activated by means of the control assembly in the closing routine so as to move the lock catch from the starting position into a delay position in order to carry out a delay action and then move the lock catch into the main closing position.

BRIEF DESCRIPTION OF THE DRAWINGS

Various aspects are explained in more detail hereinafter with reference to a drawing which merely shows exemplary embodiments. In the drawing.

DETAILED DESCRIPTION

Figure 1:
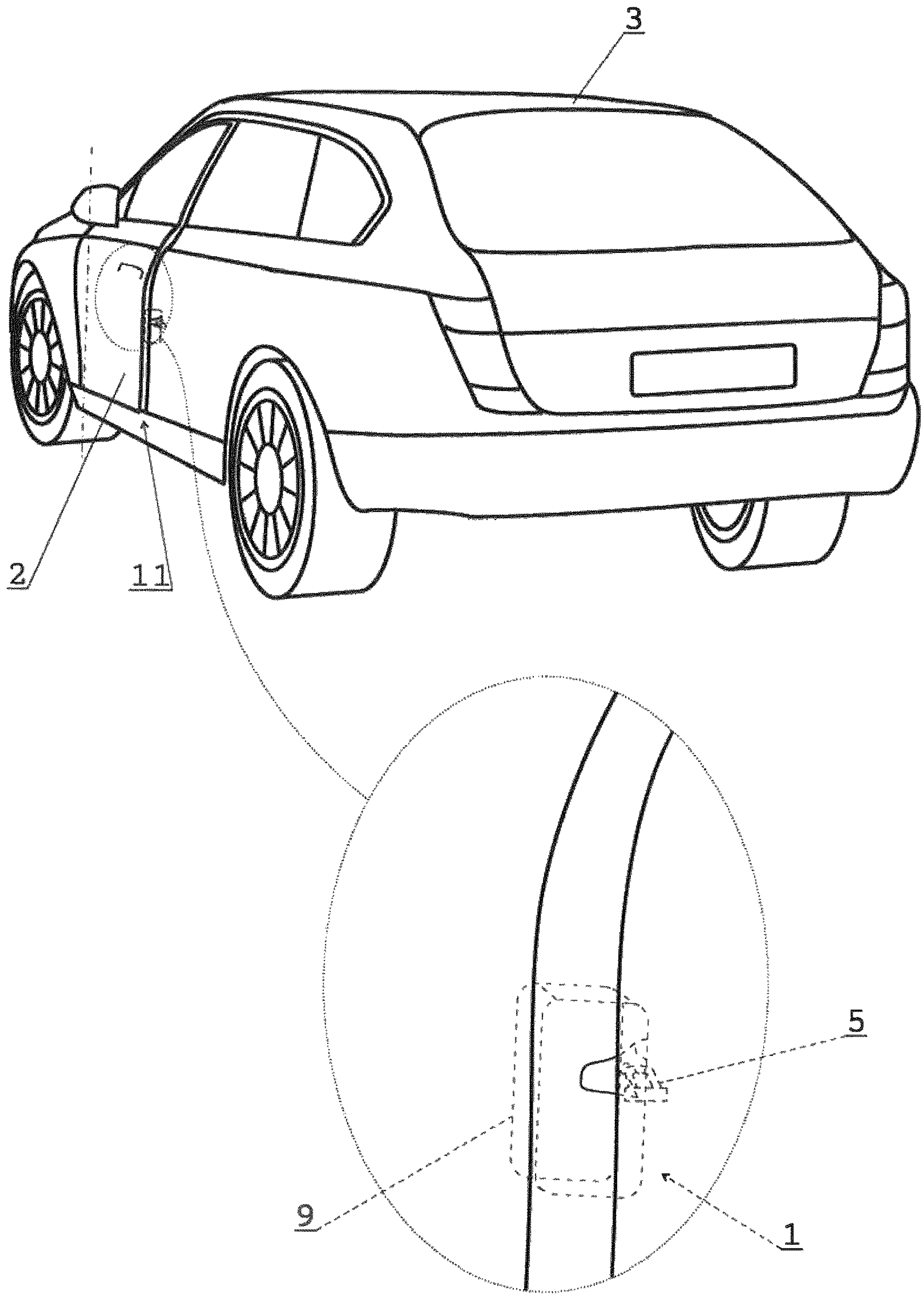
FIG. 1 shows a schematic perspective view of a motor vehicle with a proposed motor vehicle lock.

The drawing shows a proposed motor vehicle lock 1 which can be used for all conceivable flaps 2 of a motor vehicle 3. In this regard, reference may be made to the embodiments in the introductory part of the description.

As shown in FIG. 1, the motor vehicle lock 1 can be arranged in or on the respective flap 2. In principle, however, the motor vehicle lock 1 can also be arranged in or on the motor vehicle body (not shown).

The proposed motor vehicle lock 1 is equipped with a lock catch 4 for engaging with a closing part 5 in a holding manner and a pawl 6. The closing part 5 can also be designed as a locking bolt, locking bar, locking wedge or the like. In various embodiments, the closing part 5 is arranged on the motor vehicle body. In the views according to FIG. 2*a*) the lock catch 4 is shown in its main closing position (dashed lines) and in a starting position, such as a pre-closing position (solid lines). In the open position (not shown) the lock catch 4 releases the closing part 5.

The pawl 6 locks an opening of the lock catch 4 in the lowered position shown and releases the lock catch 4 in a raised position. In some embodiments, the pawl 6 is provided for locking the lock catch 4 both in the main closed position and in the pre-closing position.

The exemplary embodiment, which is shown in the figures, relates to a motor vehicle lock for a flap 2 of a motor vehicle 3, wherein the motor vehicle lock 1 is equipped with a lock catch 4 for engaging with a closing part 5 in a holding manner and a pawl 6 which is assigned to the lock catch 4 and which locks an opening of the lock catch 4 in the lowered position and releases the lock catch 4 in a raised position, wherein the motor vehicle lock 1 has an electric closing drive 7 and a control assembly 8, wherein the control assembly 8 activates the closing drive 7 in a closing routine so as to move the lock catch 4 in the closing direction from a starting position, such as a pre-closing position, into a main closing position.

The electric closing drive 7 can be arranged separately from a lock housing 9 which receives the lock catch 4 and the pawl 6. The closing drive 7 is provided here with a transmission means 10, for example a Bowden cable, in order to transmit the generated drive force to the lock catch 4. It is also conceivable that the closing drive 7 acts on the closing part 5.

The lock catch 4 is moved in the closing direction to the main closing position during the closing routine. As is made clear hereinafter, the lock catch 4 can also be temporarily moved in the closing routine counter to the closing direction. Generally, however, the starting position, such as the pre-closing position, is provided between the open position and the main closing position of the lock catch 4. In particular, in the starting position a gap 11, in which an object 12 such as a finger can penetrate, is present between the flap 2 and the motor vehicle body.

The control assembly 8 can be designed as part of the flap control apparatus which is assigned to the flap 2 and which interacts with a higher-level motor vehicle controller. The control assembly 8 can also be integrated in the lock housing 9. Moreover, the control assembly 8 can also be a constituent part of a central motor vehicle controller. The control assembly 8 can have an electronic control system for implementing the control tasks arising in the closing routine.

It is thus essential that the control assembly 8 activates the closing drive 7 in the closing routine so as to move the lock catch 4 from the starting position into a delay position in order to carry out a delay action and then to move the lock catch 4 into the main closing position.

The delay position can be provided between the starting position and the main closing position. A delay position can also be provided between the open position and the starting position, wherein the lock catch 4 is initially moved, for example, counter to the closing direction and after the delay action is brought into the main closing position.

The delay action generally brings about a delay in the closing routine, compared to an activation of the closing drive 7 without the delay action. Thus the user is provided with the opportunity to remove the object 12 from the gap 11. The delay brought about by the delay action, for example, is at least one second and/or at most ten seconds.

In various embodiments, it can also be provided that in the delay action an activation by the control assembly 8 is absent for a predetermined time period and/or that in the delay action the control assembly 8 activates the closing drive 7 so as to move the lock catch 4 counter to the closing direction.

Figure 2:
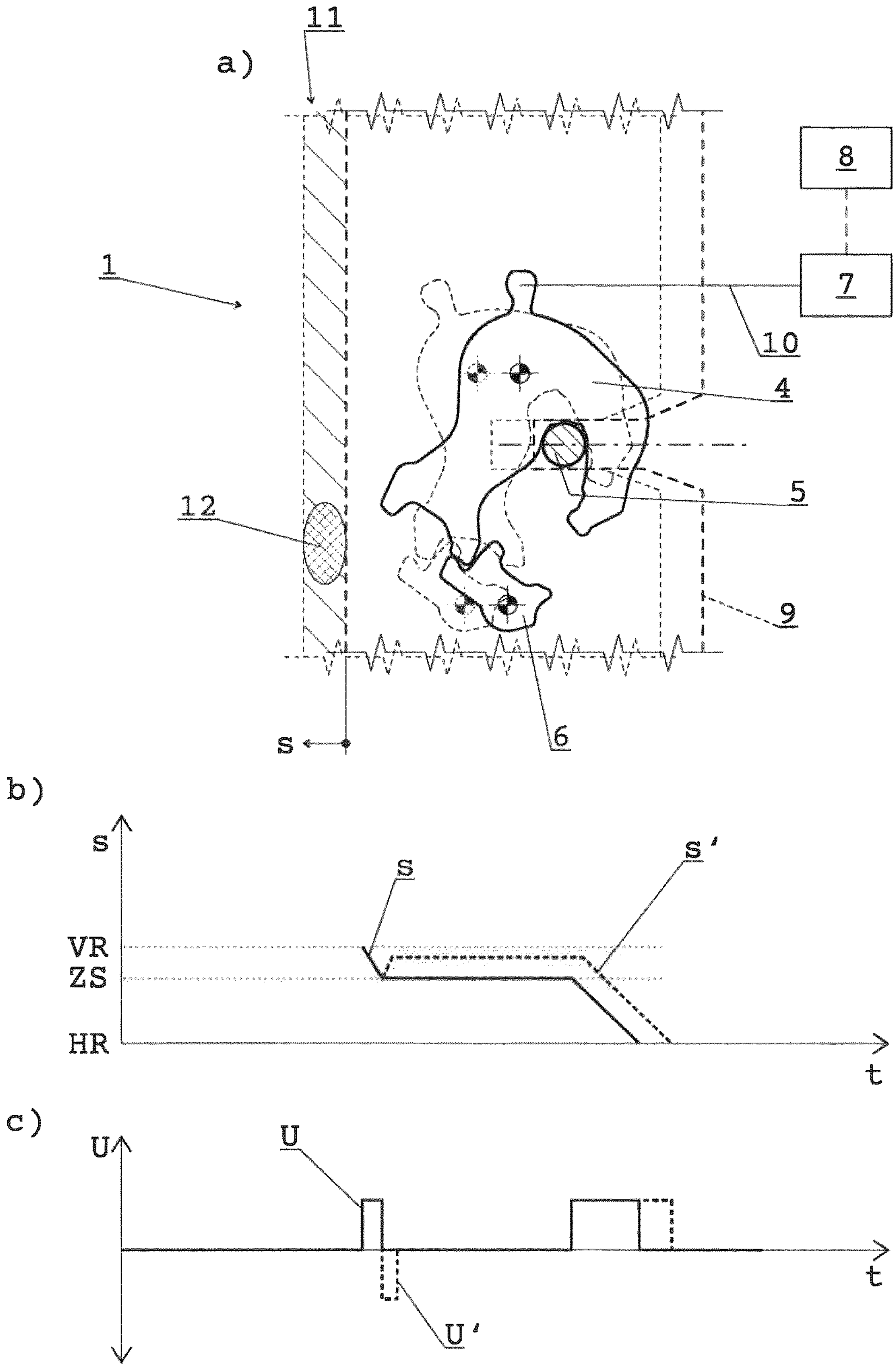
FIG. 2 shows a) a schematic view of a motor vehicle lock, and schematic views of the time dependency b) of a motion sequence and c) of a drive voltage.

FIG. 2*b* shows by way of example motion sequences of the lock catch 4 in the closing routine. The starting position is illustrated here on the basis of the pre-latching position VR and the main closing position is illustrated on the basis of the main latching position HR of the flap 2. The delay position in turn corresponds to an intermediate position ZS of the flap 2.

In the motion sequence S the lock catch 4 is initially moved as far as the delay position. Furthermore, as follows from the drive voltage U shown in FIG. 2*c*) and provided by the control assembly 8, in the delay action the activation is absent for a predetermined time period. The lock catch 4 remains for this time period in the delayed position. After the elapse of the time period, the movement to the main closing position is continued. In particular, the activation before and after the delay action is provided in the same manner, for example with the same drive voltage U. It is also conceivable that in the delay action the closing drive 7 is activated to retain the lock catch 4 actively in the delay position, for example via a generator operation of an electric motor of the closing drive 7.

In an alternative embodiment, which is shown in FIG. 2*b*) on the basis of the motion sequence S', in the delay action the control assembly 8 activates the closing drive 7 so as to move the lock catch 4 counter to the closing direction, which is brought about here by a drive voltage U' with opposing polarity. In the delay action here, the lock catch 4 accordingly leaves the delay position.

The reaching of the delay position can be detected by means of the control assembly 8 via a sensor, such as a switch assigned to the lock catch 4 and/or a motion sensor assigned to the closing drive 7. It is also conceivable that the reaching of the delay position is determined by means of the control assembly 7 on the basis of the drive values of the closing drive 7, for example on the basis of the ripple current in the drive current. In a particularly simple embodiment, it can also be provided that the closing drive 7 is initially energized for a predetermined time period, which is not sufficient for reaching the main latching position. In this regard, the delay position is not necessarily to be understood as a fixedly defined spatial position clearly determined by the control assembly 8.

It can also be provided that the control assembly 8 activates the closing drive 7 in the closing routine so as to move the lock catch 4 successively into a plurality of delay positions in order to carry out the respective delay actions.

Various embodiments are conceivable therefor. For example, an absence of the activation in a delay position can be combined with a movement of the lock catch 4 counter to the closing direction in a further delay position. FIG. 2*b*) shows by way of example with the motion sequence S' a movement counter to the closing direction with the subsequent absence of the activation.

It can also be provided here that the control assembly 8 in the closing routine, such as with the movement of the lock catch 4 into the delay position and/or with the delay action, initiates the output of a warning signal, such as via an optical and/or acoustic warning device assigned to the motor vehicle lock 1.

The output of the warning signal can inform the user of the start of the closing routine, in addition to the movement of the lock catch 4 as far as the delay position. The optical and/or acoustic warning device is not necessarily part of the motor vehicle lock 1. For example, an output device, for example a light or the like, provided for other purposes on the motor vehicle 3 can be used as a warning device.

According to various embodiments, a method is also provided for operating a motor vehicle lock for a flap 2 of a motor vehicle 3, wherein the motor vehicle lock 1 is equipped with a lock catch 4 for engaging with a closing part 5 in a holding manner and a pawl 6 which is assigned to the lock catch 4 and which locks an opening of the lock catch 4 in the lowered position and releases the lock catch 4 in a raised position, wherein the motor vehicle lock 1 has an electric closing drive 7 and a control assembly 8, wherein the closing drive 7 is activated by means of the control assembly 8 in a closing routine so as to move the lock catch 4 in the closing direction from a starting position, such as a pre-closing position, into a main closing position, wherein the closing drive 7 is activated by means of the control assembly 8 in the closing routine so as to move the lock catch 4 from the starting position into a delay position in order to carry out a delay action and then move the lock catch 4 into the main closing position.

Relative to the proposed method, reference is made to all of the embodiments of the proposed motor vehicle lock 1.

The invention claimed is:

1. A motor vehicle lock for a flap of a motor vehicle, wherein the motor vehicle lock is equipped with a lock catch for engaging with a closing part in a holding manner and a pawl, which is assigned to the lock catch and which locks an opening of the lock catch in a lowered position and releases the lock catch in a raised position, wherein the motor vehicle lock has an electric closing drive and a control assembly, wherein the control assembly activates the closing drive in a closing routine so as to move the lock catch in a closing direction from a starting position into a main closing position, wherein the control assembly activates the closing drive in the closing routine so as to move the lock catch from the starting position into at least one delay position in order to carry out at least one delay action and then move the lock catch into the main closing position, wherein, in the at least one delay action, the control assembly activates the closing drive so as to move the lock catch counter to the closing direction, wherein the at least one delay position is provided between the starting position and the main closing position.

2. The motor vehicle lock as claimed in claim 1, wherein in the at least one delay action, an activation by the control assembly is absent for a predetermined time period.

3. The motor vehicle lock as claimed in claim 1, wherein the at least one delay position comprises a plurality of delay positions and the at least one delay action comprises a plurality of delay actions, corresponding to the plurality of delay positions, and wherein the control assembly activates the closing drive in the closing routine so as to move the lock catch successively into the plurality of delay positions in order to carry out the corresponding delay actions.

4. The motor vehicle lock as claimed in claim 1, wherein the control assembly in the closing routine initiates the output of a warning signal.

5. A method for operating a motor vehicle lock for a flap of a motor vehicle, wherein the motor vehicle lock is equipped with a lock catch for engaging with a closing part in a holding manner and a pawl, which is assigned to the lock catch and which locks an opening of the lock catch in a lowered position and releases the lock catch in a raised position, wherein the motor vehicle lock has an electric closing drive and a control assembly, wherein the closing drive is activated by the control assembly in a closing routine so as to move the lock catch in a closing direction from a starting position into a main closing position, wherein the closing drive is activated by the control assembly in the closing routine so as to move the lock catch from the starting position into a delay position in order to carry out a delay action and then move the lock catch into the main closing position, wherein, in the at least one delay action, the control assembly activates the closing drive so as to move the lock catch counter to the closing direction, wherein the at least one delay position is provided between the starting position and the main closing position.

6. The motor vehicle lock as claimed in claim 1, wherein the starting position is a pre-closing position.

7. The motor vehicle lock as claimed in claim 1, wherein the control assembly in the closing routine with the movement of the lock catch into the at least one delay position and/or with the at least one delay action, initiates the output of a warning signal.

8. The motor vehicle lock as claimed in claim 7, wherein the control assembly initiates the output of the warning signal via an optical and/or an acoustic warning device assigned to the motor vehicle lock.

9. The motor vehicle lock as claimed in claim 4, wherein the control assembly initiates the output of the warning signal via an optical and/or an acoustic warning device assigned to the motor vehicle lock.

10. The method for operating a motor vehicle lock as claimed in claim 5, wherein the starting position is a pre-closing position.

* * * * *